US011493216B2

(12) United States Patent
Chen et al.

(10) Patent No.: US 11,493,216 B2
(45) Date of Patent: Nov. 8, 2022

(54) AIR FILTER SYSTEM AND HVAC SYSTEM

(71) Applicant: Carrier Corporation, Palm Beach Gardens, FL (US)

(72) Inventors: Lei Chen, South Windsor, CT (US); Sanming Wen, Shanghai (CN); Jianwei Zhao, Shanghai (CN)

(73) Assignee: CARRIER CORPORATION, Palm Beach Gardens, FL (US)

(*) Notice: Subject to any disclaimer, the term of this patent is extended or adjusted under 35 U.S.C. 154(b) by 420 days.

(21) Appl. No.: 16/619,824

(22) PCT Filed: Jun. 4, 2018

(86) PCT No.: PCT/US2018/035814
§ 371 (c)(1),
(2) Date: Dec. 5, 2019

(87) PCT Pub. No.: WO2018/226564
PCT Pub. Date: Dec. 13, 2018

(65) Prior Publication Data
US 2020/0103127 A1 Apr. 2, 2020

(30) Foreign Application Priority Data

Jun. 8, 2017 (CN) .......................... 201710426427.1

(51) Int. Cl.
B01D 46/00 (2022.01)
B01D 46/44 (2006.01)
(Continued)

(52) U.S. Cl.
CPC ............ F24F 8/10 (2021.01); B01D 46/0032 (2013.01); B01D 46/442 (2013.01); B01D 46/46 (2013.01);
(Continued)

(58) Field of Classification Search
CPC .... F24F 3/16; F24F 3/163; F24F 3/044; F24F 8/10; F24F 11/00; F24F 13/28;
(Continued)

(56) References Cited

U.S. PATENT DOCUMENTS 5,117,899 A 6/1992 Skimehorn
5,279,609 A 1/1994 Meckler
(Continued)

FOREIGN PATENT DOCUMENTS

EP 1434012 A2 6/2004
EP 3121524 A1 1/2017
WO 2017055466 A1 4/2017

OTHER PUBLICATIONS

International Search Report and Written Opinion for application PCT/US2018/035814, dated Sep. 10, 2018, 12 pages.

Primary Examiner — Minh Chau T Pham
(74) Attorney, Agent, or Firm — Cantor Colburn LLP

(57) ABSTRACT

The present invention provides an air filtering system for use in a building and an HVAC system, wherein the air filtering system includes: an outside-air inlet; a first filtering stage at the downstream of the outside-air inlet; a second filtering stage at the downstream of the first filtering stage; a collection module for collecting outside-air quality information; and a control module in communication with the collection module, wherein the control module adjusts an operation state of the first filtering stage and/or the second filtering stage based on the air quality information collected by the collection module. The system of the present invention has the advantages of energy saving, low maintenance cost, etc.

14 Claims, 1 Drawing Sheet

(51) Int. Cl.
- *B01D 46/48* (2006.01)
- *B01D 46/46* (2006.01)
- *B01D 46/62* (2022.01)
- *F24F 8/10* (2021.01)
- *F24F 13/28* (2006.01)
- *B03C 3/017* (2006.01)
- *F24F 8/192* (2021.01)
- *F24F 110/52* (2018.01)
- *F24F 8/99* (2021.01)

(52) U.S. Cl.
CPC .............. *B01D 46/62* (2022.01); *B03C 3/017* (2013.01); *F24F 8/192* (2021.01); *F24F 13/28* (2013.01); *B01D 2279/40* (2013.01); *B01D 2279/50* (2013.01); *F24F 8/99* (2021.01); *F24F 2110/52* (2018.01)

(58) Field of Classification Search
CPC .. B01D 46/0032; B01D 46/442; B01D 46/46; B01D 46/62; B01D 46/48
USPC ................ 55/DIG. 34; 96/417, 240; 454/299
See application file for complete search history.

(56) References Cited

U.S. PATENT DOCUMENTS

| | | | |
|---|---|---|---|
| 5,531,800 A * | 7/1996 | Sewell | F24F 3/044 96/240 |
| 5,590,830 A | 1/1997 | Kettler et al. | |
| 5,742,516 A | 4/1998 | Olcerst | |
| 6,030,437 A * | 2/2000 | Gourrier | F24F 8/10 96/417 |
| 6,327,812 B1 | 12/2001 | Hedman et al. | |
| 6,494,777 B1 | 12/2002 | Chiang | |
| 6,698,219 B2 | 3/2004 | Sekhar et al. | |
| 6,790,136 B2 | 9/2004 | Sharp et al. | |
| 6,988,671 B2 | 1/2006 | Deluca | |
| 7,434,413 B2 | 10/2008 | Wruck | |
| 8,038,778 B2 | 10/2011 | Chan et al. | |
| 9,254,459 B2 | 2/2016 | Miller | |
| 9,328,936 B2 | 5/2016 | Meirav et al. | |
| 9,353,966 B2 | 5/2016 | Finkam | |
| 2003/0181158 A1 | 9/2003 | Schell et al. | |
| 2007/0105494 A1* | 5/2007 | Lin | F24F 3/163 454/299 |
| 2009/0143915 A1 | 6/2009 | Dougan et al. | |
| 2012/0137876 A1* | 6/2012 | Miller | B01D 46/0043 55/471 |
| 2013/0055692 A1* | 3/2013 | Cecchi | B01D 46/10 55/342 |
| 2013/0061659 A1 | 3/2013 | Ajay et al. | |
| 2015/0075373 A1* | 3/2015 | Miller | B01D 46/0032 96/400 |
| 2017/0028336 A1 | 2/2017 | Zhenhua et al. | |
| 2017/0203241 A1* | 7/2017 | Subedi | B01D 35/147 |

\* cited by examiner

AIR FILTER SYSTEM AND HVAC SYSTEM

TECHNICAL FIELD

The present invention relates to an air purification system for use in a building, and more particularly to an intelligent air purification system.

BACKGROUND ART

As air pollution becomes more and more serious, the demand for air purification systems is increasing. For a fresh air system of a building, the problems that need to be faced with when providing an air purification function are high power consumption and expensive maintenance costs.

SUMMARY OF THE INVENTION

The object of the present invention is to solve or at least alleviate the problems existing in the prior art.

According to one aspect of the present invention, provided is an air filtering system for use in a building, and the air filtering system comprises:
  an outside-air inlet;
  a first filtering stage at the downstream of the outside-air inlet;
  a second filtering stage at the downstream of the first filtering stage;
  a collection module for collecting outside-air quality information; and
  a control module in communication with the collection module, wherein the control module adjusts an operation state of the first filtering stage and/or the second filtering stage based on the air quality information collected by the collection module.

According to another aspect, the present invention provides an HVAC (heating ventilation and air conditioning) system having the air filtering system according to the embodiments of the present invention.

The system of the present invention has the advantages of energy saving, low maintenance cost, etc.

BRIEF DESCRIPTION OF THE DRAWINGS

Referring to the drawings, the disclosure of the present invention would be easy to understand. A person skilled in the art would easily understand that these drawings are merely for illustrative purposes, and are not intended to limit the scope of protection of the invention. Additionally, similar numbers in the drawings are used for indicating similar components, in which.

DETAILED DESCRIPTION

It would be easily understood that, according to the technical solutions of the invention, a person of ordinary skill in the art can propose multiple alternative constructions and implementations without altering the essential spirit of the invention. Therefore, the following particular embodiments and accompanying drawings are merely exemplary explanation of the technical solutions of the invention, and should in no way be considered as the entirety of the invention or be considered as constrictions or limitations to the technical solutions of the invention.

Orientation phases such as "up", "down", "left", "right", "front", "back," "front side", "back side", "top", "bottom" or the like mentioned or may be mentioned in the specification are defined relative to the constructions shown in the various accompanying drawings, are relative concepts, and thus may accordingly be varied according to their different locations and different usage stages. Therefore, these or other orientation phases should not be construed as limiting either.

Figure 1:
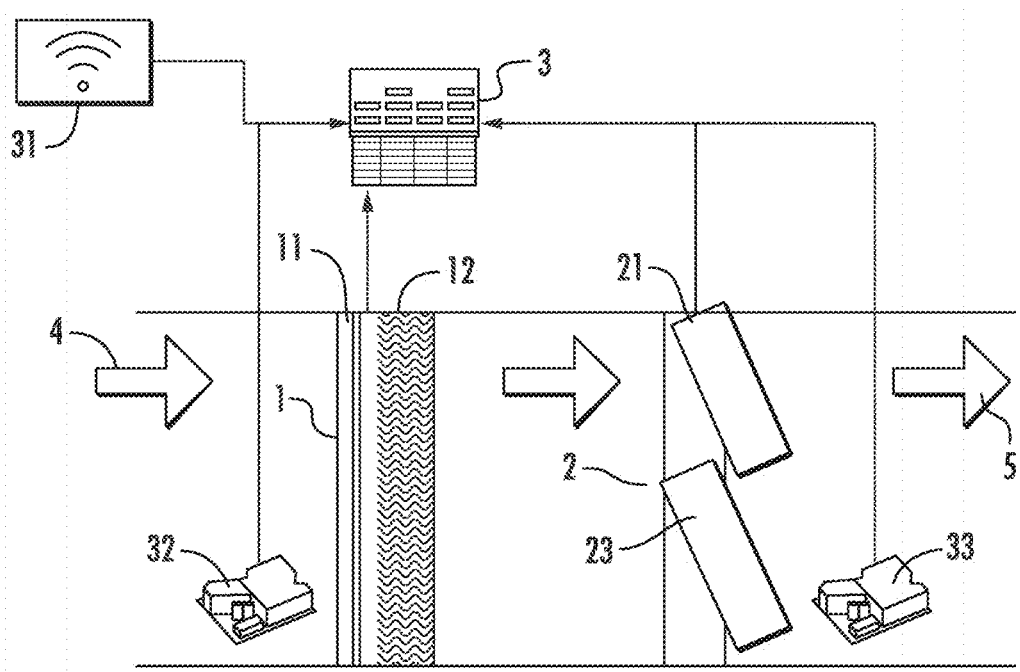
FIG. 1 shows a structural schematic view of an air filtering system according to the embodiments of the invention.

The air filtering system as shown in FIG. 1 comprises: an outside-air inlet 4; a first filtering stage 1 at the downstream of the outside-air inlet 4; a second filtering stage 2 at the downstream of the first filtering stage 1; a collection module for collecting outside-air quality information; and a control module 3, such as a computer, in communication with the collection module, wherein the control module 3 adjusts an operation state of the first filtering stage 1 and/or the second filtering stage 2 according to the air quality information collected by the collection module.

In some embodiments, the air filtering system can operate in a plurality of operation modes, for example, a first mode in which neither the first filtering stage nor the second filtering stage operates, a second mode in which the first filtering stage operates but the second filtering stage does not operate, or a third mode in which both the first filtering stage and the second filtering stage operate. The control module 3 can decide, according to the air quality information, the operation state of the first filtering stage 1 and/or the second filtering stage 2, or the operation mode of the air filtering system.

In some embodiments, the first filtering stage 1 can comprise an electrostatic adsorption-based filtering apparatus 11 and/or a primary strainer 12 that charge particulate matters in the air. The first filtering stage 1 can filter out most particulate matters in the air, and the air resistance in the first filtering stage 1 is vary small. The maintenance for the first filtering stage 1 is relatively simple, for example the particulate matters absorbed on the primary strainer 12 can be removed by washing.

In some embodiments, the second filtering stage 2 can comprise an HEPA (high-efficiency particulate air) high-efficiency strainer or median-efficiency strainer, and the HEPA high-efficiency strainer or median-efficiency strainer is tighter, has smaller meshes, and at the same time has greater air resistance. In order to enable air to pass through the second filtering stage with high air resistance, ventilation fans are typically arranged at the downstream of the second filtering stage, and these ventilation fans are devices with higher energy consumption. Furthermore, the HEPA strainer or median-efficiency strainer have smaller meshes, and particulate matters cannot be removed by washing. During use, the particulate matters may block the meshes, leading to even greater air resistance of the strainer. Moreover, during the use of the air filtering system, the HEPA strainer or median-efficiency strainer needs to be frequently replaced, and the maintenance cost is relatively high.

In the embodiments of the present application, the operation mode of the first filtering stage 1 and/or the second filtering stage 2 is intelligently controlled by means of the cooperation of the collection module and the control module 4, so as to reduce the energy consumption of the air filtering system and reduce the maintenance cost for the strainer. In some embodiments, the collection module comprises a communication module 31 that can receive outside-air quality forecast information, for example, the communication module 31 can be a wireless communication module, such as a wifi module, a bluetooth module, etc. In some embodiments, the collection module can receive, via the communication module 31, outside-air quality forecast information provided by, for example, an air quality monitoring point nearby. Since the concentration of particulate matters in the air has the characteristics like seasonality, timeliness, etc., the outside-air quality forecast information is relatively reliable. The outside-air quality forecast information can comprise, for example, forecast information about the concentration of air fine particulate matter PM 2.5 in the next hour, and the control module can at least partially control the operation mode of the air filtering system, e.g., the operation state of the first filtering stage and/or the second filtering stage, based on the information. More specifically, the filtering system can be controlled to operate in any one of the following modes, including: a first mode in which neither the first filtering stage nor the second filtering stage operates, a second mode in which the first filtering stage operates but the second filtering stage does not operate, or a third mode in which both the first filtering stage and the second filtering stage operate.

In some other embodiments, the collection module can also comprise a first sensor 32 for collecting outside-air quality information in real time, and the first sensor 32 can be arranged for example near the outside-air inlet 4 of the air filtering system or other locations near the building, so as to directly monitor the outside-air quality information entering the air filtering system, such as indexes like the concentration of PM 2.5, and so on. In some embodiments, the first sensor 32 can be integrated at the outside-air inlet side of the first filtering stage, such as being arranged in a notch. The control module 3 can at least partially control the operation mode of the air filtering system based on the outside-air quality information collected in real time by the first sensor 32 of the collection module. In particular, as an example when the outside-air quality, such as the PM 2.5 level, is smaller than a first critical value A, such as 50 $\mu g/m^3$, the control module can control the first filtering stage and the second filtering stage so that neither of the two operate; at this time, the outside air can directly pass through the air filtering system, and the ventilation fans only need to operate at a lower power. When the outside-air quality is a little poor, for example the PM 2.5 level is greater than the first critical value A and is smaller than a second critical value B, such as between 50 $\mu g/m^3$ and 100 $\mu g/m^3$, the outside air can be filtered to an acceptable degree in the first filtering stage only; at this time, the second filtering stage can still be in a non-operating mode, and the ventilation fans at its downstream can still operate at a lower power. When the outside-air quality is worse, for example the PM 2.5 level is greater than the second critical value B, the first filtering stage and the second filtering stage can both start to operate. In some embodiments, a client, such as a property manager, can set control parameters of the control module on his/her own, for example, setting the specific numerical value of the first critical value A and the second critical value B. The property manager can weigh the economic cost against the filtering efficiency, so as to select an appropriate filtering system operation solution.

In some embodiments, the air filtering system can also comprise a second sensor 33 to collect filtered-air quality information at the downstream of the second filtering stage in real time, and the control module can also at least partially control the operation mode of the air filtering system, e.g., the operation mode of the first filtering stage and/or the second filtering stage, based on the filtered-air quality information at the downstream of the second filtering stage fed back by the second sensor 33. On the other hand, the second sensor 33 can also be used for monitoring the filtering effect of the filtering system. In some other embodiments, the second sensor 33 can also be arranged in an indoor circulation air passage, so as to collect air quality information about the indoor circulating air and thus determine an optimal mixture ratio of the outside air and the indoor circulating air, in order to satisfy the requirements on air quality and energy consumption at the same time.

In some embodiments, the various pieces of air quality information collected by the collection module can be integrated to acquire a control parameter, and the operation mode of the air filtering system can be controlled based on the control parameter. For example, in some embodiments, the operation mode of the first filtering stage and/or the second filtering stage can be controlled based on the difference between the air quality fed back by the first sensor and by the second sensor; and when the first filtering stage and the second filtering stage are in an operating mode, and the above-mentioned air quality difference is not large, it indicates that the operation efficiency of the first filtering stage and/or the second filtering stage is relatively low, and one or both of the first filtering stage and/or the second filtering stage can be paused, so as to reduce energy consumption.

With respect to the first filtering stage, it can comprise an electrostatic adsorption-based filtering apparatus. When the first filtering stage comprises the electrostatic adsorption-based filtering apparatus, the control module can adjust the operation state of the first filtering stage via an electrically controllable switch. The electrostatic adsorption-based filtering apparatus can be adjusted so as to minimize the discharge of the by-product ozone that may be produced thereby. In particular, in the case where the outside-air quality is acceptable, the electrostatic adsorption-based filtering apparatus can be shut off, and an appropriate amount of outside air can be pumped in to mix with the indoor circulating air.

Figure 2:
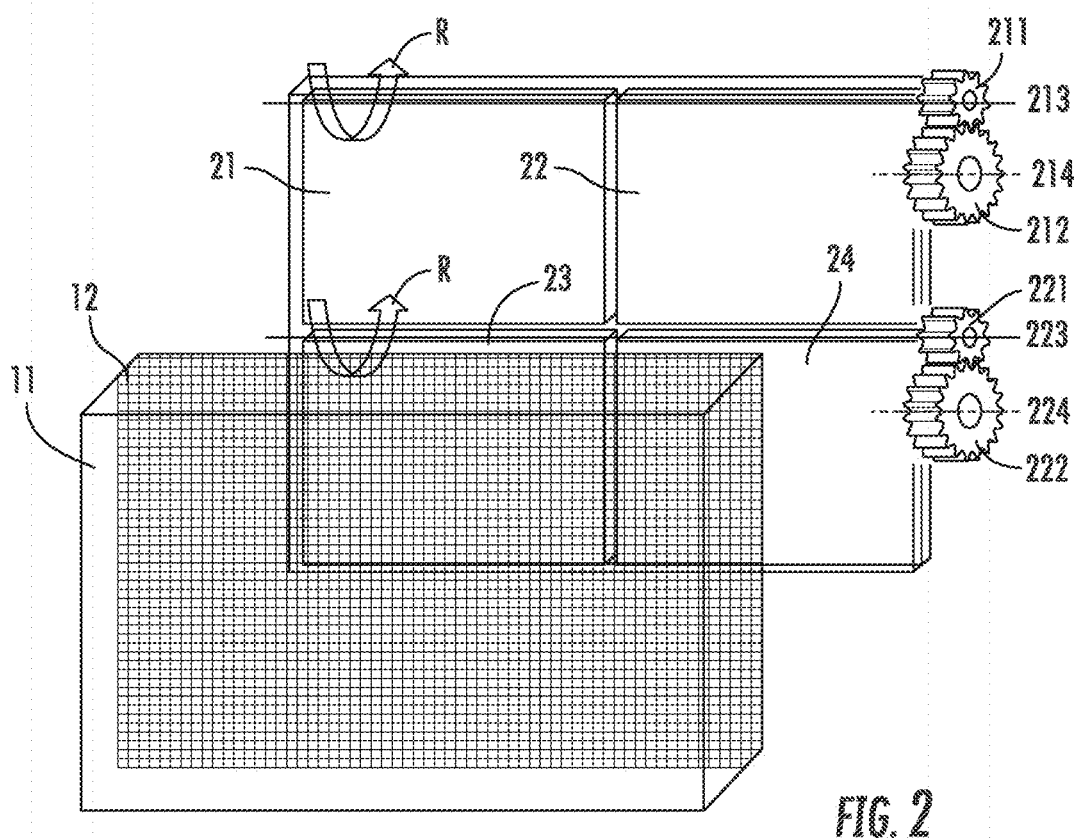
FIG. 2 shows a front view of the air filtering system according to the embodiments of the invention.

With respect to the second filtering stage, it can comprise a mechanic strainer. For example, the second filtering stage comprises one or more HEPA high-efficiency strainers or median-efficiency strainers. In some embodiments, referring to FIG. 2, the one or more strainers of the second filtering stage are mounted on a rotation shaft. In the embodiment shown in the figure, the second filtering stage comprises a first row of strainers 21, 22 connected to a first rotation shaft 213 and a second row of strainers 23, 24 connected to a second rotation shaft 223. One end of the first rotation shaft 213 and the second rotation shaft 223 can be provided with a rotation shaft gear 211, 221; the rotation shaft gear 211, 221 can for example be meshed to a motor output shaft gear 212, 222 on a motor output shaft 214, 224, and can actuate, via the rotation of a motor, various strainers to rotate in the direction pointed by the arrow R or in a reverse direction, so as to switch between an open position and a closed position. In the open position, air can pass through voids but not through the strainers, and the strainers in the second filtering stage would not work. In the closed position, air is forced to pass through the strainers, and the strainers in the second filtering stage work. The control module can control the rotation of the one or more strainers in the second filtering stage by operating the motor, so as to realize the control over the operation mode of the second filtering stage. In some embodiments, in an embodiment in which a plurality of strainers are used, a portion or all of the strainers can open by rotating about the rotation shaft. In some embodiments, the strainers can at least rotate about the shaft for an angle of more than 5 degree, such as 5 degree to 90 degree, or an angle of more than 15 degree, or an angle of more than 30 degree, or an angle of more than 45 degree, so that the strainers can be sufficiently open to reduce the resistance in the second filtering stage; thus the ventilation fans can operate with lower energy consumption, further saving the energy consumption of the ventilation fan. In some embodiments, the air filtering system can comprise a pressure sensor for detecting a pressure drop across the upstream and downstream of the second filtering stage. If the difference in pressure drop data fed back by the pressure sensor at the open position and the closed position of the second filtering stage is small, it can be determined that the strainers in the second filtering stage may have been broken. In the closed position, if the pressure drop data fed back by the pressure sensor is great, it indicates that the meshes of the strainers might be blocked, and the strainers need to be replaced.

In some other embodiments, the air filtering system can comprise a bypass path which bypasses the second filtering stage, and the bypass path can comprise an open-close element, such as an air door; and the control module can control the opening and closing of the air door. Since air would tend to go to the bypass path with low resistance and bypass the strainer when the air door of the bypass path is open, the control module can control the operation state of the second filtering stage by controlling the opening and closing of the air door of the bypass path.

On the other hand, an HVAC system is provided, and the system can comprise an air filtering system according to various embodiments of the present invention.

The particular embodiments described above are merely for describing the principle of the present invention more clearly, where various components are clearly illustrated or described to make the principle of the present invention more easy to understand. A person skilled in the art can easily make various modifications or changes to the present invention without departing from the scope of the present invention. Therefore, it should be understood that these modifications or changes should all be contained in the scope of protection of the patent of the present invention.

The invention claimed is:

1. An air filtering system, the air filtering system comprising:
   an outside-air inlet;
   a first filtering stage at the downstream of the outside-air inlet;
   a second filtering stage at the downstream of the first filtering stage;
   a collection module for collecting outside-air quality information; and
   a control module in communication with the collection module, wherein the control module adjusts an operation state of the first filtering stage and/or the second filtering stage based on the air quality information collected by the collection module;
   wherein the air filtering system is configured to at least operate in the following three modes:
      a first mode in which neither the first filtering stage nor the second filtering stage operates;
      a second mode in which the first filtering stage operates and the second filtering stage does not operate; and
      a third mode in which both the first filtering stage and the second filtering stage operate.

2. The air filtering system according to claim 1, wherein the collection module comprises a communication module, wherein the communication module receives outside-air quality forecast information, and the control module at least partially adjusts the operation state of the first filtering stage and/or the second filtering stage based on the outside-air quality forecast information.

3. The air filtering system according to claim 1, wherein the collection module further comprises a first sensor, wherein the first sensor collects outside-air quality information in real time, and the control module at least partially adjusts the operation state of the first filtering stage and/or the second filtering stage based on the outside-air quality information.

4. The air filtering system according to claim 1, wherein the collection module further comprises a second sensor, wherein the second sensor collects filtered-air quality information at the downstream of the second filtering stage in real time, and the control module at least partially adjusts the operation state of the first filtering stage and/or the second filtering stage based on the filtered-air quality information.

5. The air filtering system according to claim 1, wherein the air quality information comprises the concentration of fine particulate matters.

6. The air filtering system according to claim 1, wherein the first filtering stage comprises an electrostatic adsorption-based filtering apparatus and/or a primary strainer.

7. The air filtering system according to claim 1, wherein the second filtering stage comprises one or more HEPA strainers or median-efficiency strainers.

8. The air filtering system according to claim 7, wherein at least a portion of the HEPA strainers or median-efficiency strainers in the second filtering stage can rotate about a rotation shaft, so as to switch between a closed position and an open position.

9. The air filtering system according to claim 8, wherein a rotation angle of the one or more HEPA strainers or median-efficiency strainers is within the range of 5 degree to 90 degree.

10. The air filtering system according to claim 1, wherein the air filtering system further comprises a pressure sensor for detecting a pressure drop across the upstream and downstream of the second filtering stage.

11. The air filtering system according to claim 3, wherein the control module controls the first filtering stage and the second filtering stage so that neither of the two operate when the outside-air quality is lower than a first critical value; the control module controls the first filtering stage and the second filtering stage so that both of the two operate when the outside-air quality is higher than a second critical value; and the control module controls the first filtering stage and the second filtering stage so that the first filtering stage operates and the second filtering stage does not operate, when the outside-air quality is between the first critical value and the second critical value.

12. The air filtering system according to claim 3, wherein the collection module further comprises a second sensor, wherein the second sensor collects filtered-air quality information at the downstream of the second filtering stage in real time, and the control module pauses one or both of the first filtering stage and/or the second filtering stage when a difference between the outside-air quality information and the filtered-air quality information is lower than a threshold.

13. The air filtering system according to claim 7, further comprising a bypass path which bypasses the second filtering stage, wherein the bypass path can comprise an opening-closing element, and the control module controls the operation state of the second filtering stage by controlling the opening-closing element.

14. An HVAC system, wherein the HVAC system comprises an air filtering system as claimed in claim 1.

* * * * *